United States Patent [19]

Noda et al.

[11] 4,308,284
[45] Dec. 29, 1981

[54] PROCESS FOR PRODUCING KOJI FOR FERMENTED FOOD PRODUCTS

[75] Inventors: Fumio Noda, Kamagaya; Keitaro Mogi, Noda; Akio Hagiwara, Showa; Takashi Iwaasa, Noda, all of Japan

[73] Assignee: Kikkoman Shoyu Co. Ltd., Chiba, Japan

[21] Appl. No.: 142,690

[22] Filed: Apr. 22, 1980

[30] Foreign Application Priority Data

Apr. 27, 1979 [JP] Japan .................................. 54-51467

[51] Int. Cl.³ .......................... A23L 1/10; A23L 1/20; A23L 1/238
[52] U.S. Cl. .......................................... 426/7; 426/11; 426/18; 426/46; 426/52; 426/60; 426/589; 426/592
[58] Field of Search ...................... 426/7, 9, 11, 18, 31, 426/46, 52, 60, 589, 592

[56] References Cited

U.S. PATENT DOCUMENTS

| | | | |
|---|---|---|---|
| 3,711,303 | 1/1973 | Luksas et al. | 426/18 |
| 3,937,844 | 2/1976 | Koyama | 426/46 |
| 4,046,921 | 9/1977 | Akao et al. | 426/46 |
| 4,115,591 | 9/1978 | Noda et al. | 426/7 |
| 4,117,169 | 9/1978 | Noda et al. | 426/7 |
| 4,180,590 | 12/1979 | Kazuo et al. | 426/18 |
| 4,209,535 | 6/1980 | Williams | 426/52 X |

*Primary Examiner*—Robert A. Yoncoskie
*Attorney, Agent, or Firm*—Sherman & Shalloway

[57] ABSTRACT

In a process for producing koji for a fermented food product which comprises inoculating a koji mold in a modified koji substrate and cultivating it at a temperature of about 20° C. to about 40° C. for a time sufficient to produce koji for the fermented food product in the presence of a salt of an aliphatic carboxylic acid with up to 4 carbon atoms; the improvement wherein the cultivation is carried out in the presence of at least one added member selected from the group consisting of lactic acid bacteria and yeasts.

10 Claims, No Drawings

PROCESS FOR PRODUCING KOJI FOR FERMENTED FOOD PRODUCTS

This invention relates to an improved process for producing koji which is suitable for use in the manufacture of fermented food products such as soy sauce, miso and sake (wine from rice), and particularly to an improved process for producing koji for fermented products. The koji promotes the fermentation and aging of "moromi" and makes it possible to shorten drastically the period required for these steps, to inhibit strongly the growth of contaminating bacteria and to produce fermented food products of high quality in good yields.

More specifically, this invention relates, in a process for producing koji for a fermented food product which comprises inoculating a koji mold in a modified koji substrate and cultivating it at a temperature of about 20° to about 40° C. for a time sufficient to produce koji for the fermented food product in the presence of a salt of an aliphatic carboxylic acid with up to 4 carbon atoms, to the improvement wherein the cultivation is carried out in the presence of at least one added member selected from the group consisting of lactic acid bacteria and yeasts.

According to conventional practice, koji for fermented products is produced by inoculating a koji mold, or a koji mold in the form of a seed starter, in a koji substrate, and cultivating it in a microbiologically open system at a temperature of about 20° to about 40° C. for a time sufficient to produce koji for fermented food products. Hence, there is a possibility that bacteria which adversely affect the quality of the koji product will grow and contaminate the cultivation system. When the contamination of the cultivation system by contaminating bacteria increases beyond an allowable extent, both the quality and yield of koji are reduced, and the amounts formed and accumulated of useful enzymes such as protease and amylase required for the fermentation and aging of moromi are insufficient. If fermented food products are produced by using such a koji, therefore, the fermentation of the fermentation system does not proceed actively. Accordingly, the fermentation and aging period is unduly prolonged, and abnormal fermentation occurs owing to the precence of contaminating bacteria in the fermentation system. All this is likely to affect adversely the quality of the resulting fermented food products.

Various suggestions have been made in the past in an attempt to solve these technical problems in a process for producing koji for fermented products. As one good suggestion, U.S. Pat. No. 4,115,591 discloses a process which comprises inoculating a koji mold in a modified koji substrate and cultivating it at a temperature of about 20° to about 40° C. for a time sufficient to produce koji for fermented food products in the presence of a salt of an aliphatic carboxylic acid with up to 4 carbon atoms.

The present inventors have made extensive investigations in order to provide a more improved process for producing koji for fermented products. These investigations have led to the discovery that if the cultivation disclosed in the above-cited U.S. Patent whose inventorship partly overlaps that of the present application is carried out in the presence of at least one salt of an aliphatic carboxylic acid having up to 4 carbon atoms and at least one added member selected from the group consisting of lactic acid bacteria and yeasts, contaminating bacteria which adversely affect the quality of koji can be further inhibited, and frequently, can even be caused to die, without any adverse effect on the growth of koji.

It has also been found that the resulting koji product has produced and accumulated therein sufficient amounts of enzymes such as protease and amylase useful for the manufacture of fermented food products, and by utilizing koji having a high content of useful enzymes and a reduced content of contaminating bacteria, fermentation and aging can be promoted greatly in the manufacture of fermented food products to give fermented food products of higher quality in better yields while shortening the period required for the steps of making koji and the period required for the manufacture of the fermented food products.

It has further been found that the use of the koji produced by the present invention makes it possible to form fermented food products of low sodium chloride content such as low-salt soy sauce which have been difficult in practice to produce with conventional kojis. For example, in the production of soy sauce, if the sodium chloride concentration of the fermentation system is reduced to below about 15%, contaminating bacteria which may come into the fermentation system from the koji or from the air will reduce the quality of the resulting soy sauce and in an extreme case, will spoil it. Accordingly, in the conventional practice, fermentation is performed while maintaining the sodium chloride concentration at about 17% or more. To obtain low-salt soy sauce, the resulting fermented product must be adjusted to a low sodium chloride content by, for example, dilution. This will inevitably reduce its flavor and other qualities. Furthermore, in a fermentation system having sodium chloride in a high concentration, the activities of useful enzymes such as protease and amylase are inhibited, and the activities of useful microorganisms such as yeasts and lactic acid bacteria are also inhibited, so that the fermentation and aging period is disadvantageously prolonged.

The investigations of the present inventors have shown that if the koji product obtained by the process of this invention is used in manufacturing a fermented food product, any contaminating bacteria which happen to come into the fermentation system do not adversely affect the fermented product because the rate of growth of large quantities of lactic acid bacterium and/or yeast adhering to the koji far exceeds that of the contaminating bacteria, and therefore a satisfactory fermented food product can be obtained at a sodium chloride concentration in the fermentation system of less than about 15%, for example about 7 to about 10%. It has been found that the use of the koji for soy sauce obtained by the process of this invention leads to a rapid and active growth of useful microorganisms such as yeasts or lactic acid bacteria at such a low sodium chloride concentration as above to form lactic acid, acetic acid, alcohols, etc. as metabolites thereof and inhibit the growth of contaminating bacteria, and therefore, that abnormal fermentation and putrefaction by these contaminating bacteria can be inhibited, and the activities of useful enzymes for koji such as protease and amylase increase to give fermented food products of high quality within shorter periods of fermentation.

It is an object of this invention therefore to provide an improved process for making koji for fermented food products which produces a highly satisfactory effect of inhibiting the growth of contaminating bacteria, the koji having improved enzymic activities and being capable of affording fermented food products having improved superior taste, flavor and quality.

The above and other objects of this invention along with its advantages will become more apparent from the following description.

According to the process of this invention, koji for fermented food products is prepared by a process which comprises inoculating a koji mold in a modified koji substrate and cultivating it at a temperature of about 20° to about 40° C. for a time sufficient to produce koji for fermented food products in the presence of at least one salt of an aliphatic carboxylic acid with up to 4 carbon atoms, and at least one added member selected from the group consisting of lactic acid bacteria and yeasts.

In performing the process of this invention, a koji substrate composed of a material preferably selected from the group consisting of vegetable protein materials, fish protein materials and vegetable carbohydrate materials is modified by conventional modifying means. These conventional modifying means include, for example, steam treatment in which water is added to an unmodified koji substrate or raw materials therefor, and the mixture is heated with saturated steam at atmospheric or elevated pressures, followed by cooling the product spontaneously or rapidly; roasting treatment wherein the materials are dry-heated at high temperatures either directly or after adding water; and puffing treatment wherein after adding water or without adding water, the materials are heat-treated with saturated steam or superheated steam at high temperatures, and the product is rapidly released into an atmosphere kept at a lower pressure. Other modifying means can also be used, but the steaming, roasting and puffing treatments cited above are preferred for use in the present invention.

The proteinous materials used as the unmodified koji substrate include, for example, vegetable protein materials such as soybean, defatted soybean, dehulled soybean, and gluten. Fish meal is an example of the fish protein material. The carbohydrate materials as the unmodified koji substrate may, for example, include wheat, wheat bran, rice, barley, oats and corn. Soy sauce lees, sake lees and rice bran can also be utilized. These materials may be used as mixtures with each other.

According to the process of this invention, a koji mold is inoculated in the modified koji substrate and cultivated. The cultivation conditions can be varied according, for example, to the composition of the koji substrate or the type of the koji mold used. Preferably, the cultivation is performed at a temperature of about 20° to about 40° C. The pH of the cultivation system can be varied suitably, and, for example, it is about 4 to about 7.5. The cultivation time is preferably about 25 to about 80 hours.

The koji molds used in the process of this invention are known, and are, for example, known molds belonging to genera Aspergillus, Rhizopus, Mucor and Penicillium.

Specific examples of these koji molds are as follows:
*Aspergillus oryzae* ATCC-20386, ATCC-11866 and ATCC-14895; *Aspergillus phoenicis* ATCC-14332; *Aspergillus niger* ATCC-1004 and ATCC-15475; *Aspergillus awamori* ATCC-14331, ATCC-14333 and ATCC-14335; *Rhizopus oryzae* ATCC-4858 and HUT-1270; *Rhizopus oligosporus* ATCC-22959; *Rhizopus japonicus* ATCC-8466; *Rhizopus formosaensis* IAM-6245; *Mucor circinelloides* ATCC-15242; *Mucor japanicus* IAM-6108; *Mucor circinelloides* ATCC-8770; *Penicillium glaucum* AHU-8026; and *Penicillium fuscum* ATCC-10447.

In the above designations of microorganism depositories, HUT stands for Hiroshima University, Faculty of Engineering, Hiroshima, Japan; IAM, for Institute of Applied Microbiology, University of Tokyo, Japan; AHU, for Faculty of Agriculture, Kokkaido University, Sapporo, Japan; and ATCC, for American Type Culture Collection, U.S.A.

The cultivation in accordance with the process of this invention is carried out in the presence of a salt of an aliphatic carboxylic acid having up to 4 carbon atoms, and at least one added member selected from the group consisting of lactic acid bacteria and yeasts.

Examples of the salt of an aliphatic carboxylic acid having up to 4 carbon atoms are salts formed between such aliphatic carboxylic acids as formic acid, acetic acid, propionic acid or butyric acid and alkaline earth metals such as calcium or magnesium and alkali metals such as sodium and potassium. These salts can be used either singly or in combination with each other. These salts may be added directly or after they are diluted with a powder such as wheat flour or rice flour or a liquid such as water. The latter can be effected by using means normally used in contacting solids with liquids, for example by spraying, scattering or dipping. The amount of the aliphatic carboxylic acid salt is preferably about 0.05 to about 8% by weight, more preferably about 0.1 to about 3% by weight, based on the total weight of the unmodified koji substrate. The above-specified range is preferred in view of the effect of inhibiting the growth of contaminating bacteria and of increasing the amounts formed and accumulated of useful enzymes.

The addition of the salt of an aliphatic carboxylic acid having up to 4 carbon atoms to the unmodified substrate may be effected before the above-mentioned modifying treatment, or during the modifying treatment, or after the modifying treatment but before the inoculation of the koji molds, or at any time after the inoculation, preferably during at least the first half of the cultivation step.

The cultivation is carried out in the further presence of lactic acid bacteria and/or yeasts added besides the aforesaid carboxylic acid salt.

Known lactic acid bacteria can be used in this invention. Examples are *Leuconostoc mesenteroides* var. sake IFO-3832 and IFO-12454; *Lactobacillus sake* IFO-3541 and IFO-12456; *Pediococcus halophilus* ATCC-13624; *Pediococcus soyae* IAM-1681 and IFO-12172; and *Streptococcus faecalis* IFO-12580.

Examples of the yeast include *Saccharomyces rouxii* IFO-0495, IFO-0505, IFO-0506, IFO-0510, IFO-0513, IFO-0517, IFO-0570, OUT-7134, OUT-7135 and OUT-7136; *Torulopsis etchellsii* IFO-1229; *Torulopsis versatilis* IFO-0652 and IFO-1231 and *Saccharomyces cerevisiae* IFO-0305, IFO-0306, IFO-0308 and IFO-0309.

In the above designations of microorganism depositories, IFO stands for Institute for Fermentation, Osaka, Japan; and OUT, for Faculty of Engineering, Osaka University, Osaka, Japan.

These lactic acid bacteria and yeasts may be used singly or in combination with each other.

The lactic acid bacteria and/or yeasts can be added for example, at the time from the formation of the modified koji substrate to any time after the inoculation of the koji molds, preferably during at least the first half of the cultivation step. When heat-treatment is carried out at high temperatures in the preparation of the modified koji substrate, it is appropriate to add the lactic acid bacteria and/or yeasts after the treated substrate subjected to heat treatment has cooled to room temperature. Preferably, the lactic acid bacteria and/or yeasts are added at any suitable time after the modifying treatment until at least the first half of the cultivation step.

The amount of the lactic acid bacteria and/or yeasts may be varied, but preferably is about $10^1$ to about $10^6$ cells per gram of the modified koji substrate, more preferably from about $10^2$ to about $10^4$ cells per gram of the modified koji substrate. If the amount is too small, no sufficient effect can be obtained easily, and if it is too large, these microorganisms may adversely affect the growth of the koji mold.

It has been unexpectedly found that according to the process of this invention which is carried out in the presence of the salt of an aliphatic carboxylic acid and lactic acid bacteria and/or yeasts, the growth of koji molds, lactic acid bacteria and yeasts, especially lactic acid bacteria, is promoted probably because of the buffering action of the salt near neutrality in addition to the marked inhibition of the growth of contaminating bacteria. As a result, the contaminating bacteria are completely prevented from growing or are caused to die by the antibacterial action of the carboxylic acid salt and the antagonistic action of lactic acid bacteria and yeasts which grow on koji. Accordingly, the resulting koji scarcely contains contaminating bacteria. Moreover, the amounts of protease and amylase which are important for fermentation increase to 1.2-1.4 times, and 1.1 to 1.4 times, respectively, and the amounts of useful lactic acid bacteria and/or yeasts contained in the koji are sufficiently high. Hence, when the resulting koji is used as a main constituent ingredient of moromi for the production of fermented food products, the moromi immediately begins to be fermented actively, and the time period required for its fermentation and aging can be shortened to at least one-third. The ratio of utilization of the starting raw materials increases, and fermented food products can be obtained which have large amounts of useful components such as sugars, alcohols and organic acids and are organoleptically excellent.

Since the aliphatic carboxylic acid salt used in this invention is mostly or completely assimilated by the koji mold, lactic acid bacteria and yeasts during koji making, no trouble in taste and sanitation is caused to the final product.

The following Examples illustrate the process and advantages of this invention in comparison with the prior art.

Culture broths of lactic acid bacteria and yeasts used in these examples were prepared as shown below. The numbers of living cells of lactic acid bacterium, yeast and contaminating bacteria in koji were measured by the method shown below. The items given in Tables in these Examples are explained below.

(1) Preparation of a culture broth of lactic acid bacterium:

A lactic acid bacterium was inoculated in a sterilized culture medium of the following composition, and subjected to stationary cultivation at 30° C. for 24 hours.

Culture medium for lactic acid bacterium (% by w/v)

Meat extract: 1%
Polypeptone: 1%
Yeast extract: 0.5%
Glucose: 1%
Sodium chloride: 10%
Calcium carbonate: 1.0%
pH: 7.0

(2) Preparation of a culture broth of yeast:

A yeast was inoculated in a sterilized culture medium of the following composition, and subjected to shaking cultivation at 30° C. for 24 hours.

Yeast extract: 0.5%
Polypeptone: 1.0%
Glucose: 5.0%
Sodium chloride: 10.0%
pH: 5.0

(3) Method for measuring the numbers of cells of lactic acid bacteria, yeast and contaminating bacteria:

One gram of koji was suspended in 100 ml of aseptic physiological saline, and successively diluted with aseptic physiological saline. One milliliter of the dilution was mixed with each of an agar medium for lactic acid bacteria, an agar medium for yeasts, and an agar medium for contaminating bacteria. In the case of lactic acid bacteria, the mixture was deaerated and then cultivated at 30° C. for 6 days in an incubator filled with carbon dioxide gas, and the number of colonies formed was measured. In the case of yeast, the mixture was cultivated at 30° C. for 6 days in an ordinary incubator, and the number of colonies was measured. In the case of the contaminating bacteria, the mixture was cultivated at 37° C. for 24 hours in an ordinary incubator, and the number of colonies formed was measured. The number of lactic acid bacteria was subtracted from the resulting number, and the balance was defined as the number of contaminating bacteria.

(4) The specific protease and amylase activities are ratios of activities when the activity value of the koji in a control containing no additive is taken as 100. The protease and amylase activity values were measured by the following method. Ten grams of the koji was mixed with 100 ml of distilled water, and the mixture was allowed to stand for 24 hours at 5° C. The mixture was then filtered, and the filtrate was used as an enzyme solution. The protease and amylase activities of this solution were determined by the method described in the Japanese-language publication "Science of Seasoning", Vol. 22, No. 3, Page 14 (1975).

(5) Values of analysis of the components of moromi liquid and miso:

NaCl, T.N., R.S., Alc. and L.A. in the tables respectively stand for the amounts of sodium chloride, total nitrogen, reducing sugar, alcohol and lactic acid. The analysis was carried out by the method described in the Japanese-language publication "Analysis Methods in Fermentation" (by Shoichi Yamada, published by Sankyo Tosho Kabushiki Kaisha).

(6) Organoleptic test

Moromi liquid or miso in the second and subsquent lots was compared with the first lot (control). The results were rated on a scale of 0 (no difference), 1 (some difference), 2 (large difference), and 3 (very large difference). When the moromi or miso had a better flavor than that in the control, the sign "+" was attached, and when the former was inferior to the latter in flavor, the sign "−" was attached. The ratings in the tables were averages of the results obtained by 20 well-trained panelists having differentiating ability. The sign (*) in the column of "Value" shows that the difference was significant at 5% level; the sign (**), the difference was significant at 1% level; and the sign (—), the difference was not significant.

EXAMPLE 1

In each of 15 test lots, 13.5 liters of hot water at 80° C. having dissolved therein 100 g (0.5% based on the entire koji-making materials) of each of the additives shown in Table 1 was uniformly sprayed on 10 kg of defatted soybeans, and they were steamed for 10 minutes at a saturated steam pressure of 2 kg/cm$^2$.G. Wheat (10 kg), roasted and crushed, was mixed, and 100 g of a seed koji mold (the number of available spores $10^9$/g), *Aspergillus oryzae* ATCC-14895, was inoculated in the mixture. Then, 3 ml of a suspension of a mixture of various contaminating bacteria (the number of living cells $10^9$/ml) separated from a soy sauce koji was sprayed uniformly. As shown in Table 1, predetermined amounts of a culture broth of *Rediococcus soyae* IAM-1681, a soy sauce lactic acid bacterium, and a culture broth of *Saccharomyces rouxii* IFO-0495, a soy sauce yeast, were added. Each test lot was placed in one koji-making tray, and subjected for 42 hours to a usual control of soy sauce koji making in an aseptic incubator kept at 30° C. Thus, 15 kinds of soy sauce koji were obtained.

The numbers of cells of contaminating bacteria, lactic acid bacterium and yeast, and the specific activities of protease and amylase were measured.

The koji was mixed with 40 liters of 22% sodium chloride solution and fermented and aged at 30° C. The aged moromi liquid was analyzed for components, and the ratio of nitrogen utilization and the number of days required for aging were examined. The moromi liquid was also organoleptically tested. The results are shown in Table 1.

It is seen from the results obtained that the kojis obtained in the 2nd and 3rd lots in which the cultivation was performed in the presence of sodium acetate or sodium propionate but in the absence of lactic acid bacteria and yeast contained contaminating bacteria in numbers 1/65 to 1/165 time that in the first lot (control), and had superior protease and amylase specific activities of protease and amylase to the control lot. When these kojis were used in making soy sauce, the analytical values of the moromi liquid, the ratio of nitrogen utilization and the results of the organoleptic test were better than those in the first lot (control), but the period required for aging was not shortened.

The kojis in the 4th lot (comparison) in which the cultivation was carried out in the absence of the aliphatic carboxylic acid salt but in the presence of lactic acid bacteria, the 5th lot (comparison) in which the cultivation was carried out in the absence of the aliphatic carboxylic acid salt but in the presence of soy sauce yeast, and the 6th lot in which the cultivation was carried out in the absence of the aliphatic carboxylic acid salt but in the presence of lactic acid bacteria and yeast contained much the same number of contaminating bacteria as the koji of the first lot (control). When these kojis were used in soy sauce production, the period required for aging of the moromi liquid was shortened to about 1/6, but no particularly marked effect was noted in the analysis of the components of the moromi liquid, the ratio of nitrogen utilization and the results of the organoleptic test.

In contrast, the kojis obtained in the 7th to 9th lots in which the cultivation was carried out in the presence of sodium acetate and lactic acid bacteria, the 10th to 12th lots in which the cultivation was carried out in the presence of sodium acetate and soy sauce yeast and the 13th to 15th lots in which the cultivation was carried out in the presence of sodium acetate, lactic acid bacteria and yeast contained contaminating bacteria in numbers about 1/157,000 to 1/20,625,000 time that in the control lot (first lot), and the specific activitives of protease and amylase of these kojis obtained in accordance with this invention were much higher than those in the control lot (first lot). When these kojis were used in the production of soy sauce, the analytical values of the moromi liquid and the ratio of nitrogen utilization were very good, and the period required for aging was shortened to ⅓ to ½, and these kojis were organoleptically excellent.

TABLE 1 - (1)

| Lot | Item | Additive | Lactic acid bacteria (cells/g) | Yeast (cells/g) | Number of contaminating bacteria (cells/g) | Number of lactic acid bacteria (cells/g) | Number of yeast (cells/g) | Specific protease activity | Specific amylase activity |
|---|---|---|---|---|---|---|---|---|---|
| 1 | Control | None | None | None | $3.3 \times 10^8$ | 0 | 0 | 100 | 100 |
| 2 | Comparison | Sodium acetate (0.5%) | None | None | $5.1 \times 10^6$ | 0 | 0 | 125 | 119 |
| 3 | " | Sodium propionate (0.5%) | None | None | $2.1 \times 10^6$ | 0 | 0 | 118 | 113 |
| 4 | " | None | $5.0 \times 10^3$ | None | $8.8 \times 10^7$ | $3.7 \times 10^6$ | 0 | 98 | 101 |
| 5 | " | None | None | $5.0 \times 10^3$ | $1.5 \times 10^8$ | 0 | $2.7 \times 10^4$ | 103 | 99 |
| 6 | " | None | $5.0 \times 10^3$ | $5.0 \times 10^3$ | $5.3 \times 10^7$ | $2.1 \times 10^6$ | $1.1 \times 10^4$ | 97 | 97 |
| 7 | Invention | Sodium acetate (0.5%) | $5.0 \times 10^1$ | None | $2.7 \times 10^3$ | $3.6 \times 10^5$ | 0 | 124 | 120 |
| 8 | " | " | $5.0 \times 10^3$ | None | $3.5 \times 10^2$ | $8.8 \times 10^6$ | 0 | 121 | 115 |
| 9 | " | " | $5.0 \times 10^5$ | None | $4.4 \times 10^1$ | $1.3 \times 10^7$ | 0 | 118 | 113 |
| 10 | " | " | None | $5.0 \times 10^1$ | $7.6 \times 10^3$ | 0 | $3.3 \times 10^3$ | 130 | 127 |
| 11 | " | " | None | $5.0 \times 10^3$ | $8.8 \times 10^2$ | 0 | $3.9 \times 10^4$ | 129 | 129 |
| 12 | " | " | None | $5.0 \times 10^5$ | $3.1 \times 10^2$ | 0 | $1.7 \times 10^6$ | 135 | 132 |
| 13 | " | " | $5.0 \times 10^1$ | $5.0 \times 10^1$ | $5.1 \times 10^2$ | $2.7 \times 10^5$ | $1.1 \times 10^3$ | 131 | 127 |
| 14 | " | " | $5.0 \times 10^3$ | $5.0 \times 10^3$ | $8.2 \times 10^1$ | $2.7 \times 10^6$ | $2.7 \times 10^4$ | 130 | 121 |
| 15 | " | " | $5.0 \times 10^5$ | $5.0 \times 10^5$ | $1.6 \times 10^1$ | $9.8 \times 10^6$ | $7.7 \times 10^5$ | 122 | 119 |

TABLE 1 - (2)

| Lot | Item | Analysis of the components of the moromi liquid | | | | | Ratio of nitrogen utilization (%) | Organoleptic test | | Number of days required for aging |
|---|---|---|---|---|---|---|---|---|---|---|
| | | NaCl (%) | T.N. (%) | R.S. (%) | Alc (%) | L.A. (%) | | Rating | Value | |
| 1 | Control | 17.25 | 1.71 | 3.55 | 2.20 | 0.8 | 82.5 | 0 | — | 180 |
| 2 | Comparison | 17.20 | 1.77 | 4.25 | 2.36 | 0.9 | 85.6 | +0.5 | * | 180 |

TABLE 1 - (2)-continued

| Lot | Item | Analysis of the components of the moromi liquid | | | | | Ratio of nitrogen utilization (%) | Organoleptic test | | Number of days required for aging |
|---|---|---|---|---|---|---|---|---|---|---|
| | | NaCl (%) | T.N. (%) | R.S. (%) | Alc (%) | L.A. (%) | | Rating | Value | |
| 3 | " | 17.20 | 1.76 | 4.30 | 2.30 | 0.8 | 85.1 | +0.4 | * | 180 |
| 4 | " | 17.25 | 1.70 | 4.50 | 1.80 | 1.5 | 82.2 | +0.1 | — | 150 |
| 5 | " | 17.25 | 1.71 | 3.40 | 2.40 | 0.5 | 82.4 | +0.2 | — | 150 |
| 6 | " | 17.25 | 1.69 | 4.10 | 2.30 | 1.2 | 82.0 | +0.2 | — | 150 |
| 7 | Invention | 17.10 | 1.79 | 4.20 | 2.10 | 1.3 | 87.1 | +1.8 | ** | 120 |
| 8 | " | 17.15 | 1.78 | 4.25 | 2.05 | 1.5 | 86.4 | +1.9 | ** | 120 |
| 9 | " | 17.20 | 1.78 | 4.40 | 1.90 | 1.6 | 86.2 | +1.6 | ** | 120 |
| 10 | " | 17.20 | 1.79 | 3.80 | 2.50 | 0.8 | 86.6 | +0.6 | * | 120 |
| 11 | " | 17.15 | 1.78 | 3.50 | 2.65 | 0.6 | 86.3 | +0.5 | * | 120 |
| 12 | " | 17.10 | 1.78 | 3.20 | 2.80 | 0.5 | 86.6 | +0.5 | * | 120 |
| 13 | " | 17.15 | 1.78 | 3.95 | 2.30 | 1.4 | 86.4 | +2.0 | ** | 100 |
| 14 | " | 17.10 | 1.79 | 3.80 | 2.50 | 1.4 | 87.1 | +2.2 | ** | 100 |
| 15 | " | 17.15 | 1.77 | 3.15 | 2.65 | 1.3 | 86.0 | +1.9 | ** | 100 |

EXAMPLE 2

In each of 15 test lots, 7 kg of polished rice with a degree of polishing of 10% was washed in a customary manner, and dipped in 10 liters of water having dissolved therein 35 g (0.5% by weight based on the entire koji-making materials) of potassium acetate or potassium propionate, or in 10 liters of ordinary water containing nothing to cause the rice to absorb almost all water. The rice was then steamed in a customary manner and allowed to cool. Ten grams of a seed koji mold, Aspergillus oryzae (ATCC-20386) (the number of available spores $10^9$/g), was inoculated in the resulting substrate, and then 1 ml of a suspension of various contaminating bacteria separated from rice koji (the number of living cells $10^9$/ml) was uniformly sprayed. Then, as shown in Table 2, a culture broth of lactic acid bacterium, Streptococcus faecalis IFO-12580, and a culture broth of yeast, Saccharomyces rouxii IFO-0513, were added in predetermined amounts. Each test lot was placed in one koji-making tray, and subjected to a usual control of rice koji making for 48 hours in an aseptic incubator kept at 30° C. Thus, 15 kinds of rice koji were obtained.

The number of cells of contaminating bacteria, lactic acid bacterium and yeast, and the specific activities of protease and amylase were examined. Ten kilograms of the koji was mixed with 40 kg of steamed soybean and 9 kg of sodium chloride to form a moromi which was then fermented and aged at 25° C. The resulting miso was analyzed for components, and also organoleptically tested. The results are shown in Table 2.

It is seen from the results obtained that the kojis obtained in the lots of the present invention contained contaminating bacteria in numbers about 1/5000 to 1/1,182,000 time that in the control lot, and the amounts of protease and amylase secreted and accumulated in the lots of this invention were as large as about 1.3 to 1.8 times and about 1.2 to 1.6 times that of the control lot, respectively.

It is also understood that when the kojis of this invention are used in the preparation of miso, the period required for fermentation and aging can be shortened to $\frac{1}{3}$ of that required in the control lot, and the amount of water-soluble T.N., which shows a tasty component, increases by about 50 to about 80%, and that the miso produced was organoleptically excellent.

TABLE 2 - (1)

| Lot | Item | Additive | Lactic acid bacteria (cells/g) | Yeast (cells/g) | Analysis of koji | | | | |
|---|---|---|---|---|---|---|---|---|---|
| | | | | | Number of contaminating bacteria (cells/g) | Number of lactic acid bacteria (cells/g) | Number of yeast (cells/g) | Specific protease activity | Specific amylase activity |
| 1 | Control | None | None | None | $3.9 \times 10^7$ | 0 | 0 | 100 | 100 |
| 2 | Comparison | Potassium acetate (0.5%) | None | None | $5.5 \times 10^4$ | 0 | 0 | 160 | 155 |
| 3 | " | Potassium propionate (0.5%) | None | None | $3.5 \times 10^4$ | 0 | 0 | 150 | 140 |
| 4 | " | None | $5.0 \times 10^3$ | None | $2.1 \times 10^7$ | $3.3 \times 10^5$ | 0 | 95 | 98 |
| 5 | " | None | None | $5.0 \times 10^3$ | $4.1 \times 10^7$ | 0 | $4.1 \times 10^4$ | 101 | 102 |
| 6 | " | None | $5.0 \times 10^3$ | $5.0 \times 10^3$ | $1.2 \times 10^7$ | $1.7 \times 10^5$ | $3.3 \times 10^4$ | 96 | 97 |
| 7 | Invention | Potassium acetate (0.5%) | $5.0 \times 10^1$ | None | $3.1 \times 10^3$ | $9.8 \times 10^4$ | 0 | 165 | 135 |
| 8 | " | " | $5.0 \times 10^3$ | None | $4.4 \times 10^2$ | $7.7 \times 10^5$ | 0 | 160 | 140 |
| 9 | " | " | $5.0 \times 10^5$ | None | $1.6 \times 10^2$ | $2.3 \times 10^6$ | 0 | 150 | 145 |
| 10 | " | " | None | $5.0 \times 10^1$ | $7.7 \times 10^3$ | 0 | $6.3 \times 10^2$ | 135 | 120 |
| 11 | " | " | None | $5.0 \times 10^3$ | $1.6 \times 10^3$ | 0 | $7.1 \times 10^4$ | 135 | 120 |
| 12 | " | " | None | $5.0 \times 10^5$ | $5.0 \times 10^2$ | 0 | $8.8 \times 10^5$ | 130 | 115 |
| 13 | " | " | $5.0 \times 10^1$ | $5.0 \times 10^1$ | $2.7 \times 10^2$ | $6.6 \times 10^4$ | $1.3 \times 10^3$ | 175 | 150 |
| 14 | " | " | $5.0 \times 10^3$ | $5.0 \times 10^3$ | $9.1 \times 10^1$ | $6.1 \times 10^5$ | $6.9 \times 10^4$ | 170 | 155 |
| 15 | " | " | $5.0 \times 10^5$ | $5.0 \times 10^5$ | $3.3 \times 10^1$ | $1.1 \times 10^6$ | $1.0 \times 10^6$ | 155 | 150 |

TABLE 2 - (2)

| | | | | Analysis of the components of miso | | | Organoleptic test | | Number of days required for aging |
|---|---|---|---|---|---|---|---|---|---|
| Lot | | NaCl (%) | R.S. (%) | T.N. (%) | Water-soluble T.N. (%) | $\frac{\text{Water-soluble T.N.}}{\text{T.N.}} \times 100$ | Rating | Value | |
| 1 | Control | 10.25 | 12.5 | 2.10 | 0.80 | 38.1 | 0 | — | 90 |
| 2 | Comparison | 10.20 | 15.2 | 2.12 | 1.15 | 54.2 | +0.4 | * | 90 |
| 3 | Comparison | 10.20 | 14.8 | 2.10 | 1.11 | 52.9 | +0.4 | * | 90 |
| 4 | Comparison | 10.30 | 12.2 | 2.15 | 0.78 | 36.3 | +0.2 | — | 80 |
| 5 | Comparison | 10.30 | 12.0 | 2.15 | 0.80 | 37.2 | +0.2 | — | 80 |
| 6 | Comparison | 10.25 | 11.5 | 2.11 | 0.81 | 38.4 | +0.2 | — | 70 |
| 7 | Invention | 10.10 | 17.7 | 2.12 | 1.20 | 56.6 | +1.5 | ** | 60 |
| 8 | Invention | 10.10 | 17.5 | 2.11 | 1.21 | 57.3 | +1.5 | ** | 60 |
| 9 | Invention | 10.15 | 17.1 | 2.10 | 1.18 | 56.2 | +1.5 | ** | 60 |
| 10 | Invention | 10.20 | 13.5 | 2.10 | 1.35 | 64.3 | +1.4 | ** | 60 |
| 11 | Invention | 10.15 | 13.0 | 2.11 | 1.38 | 65.4 | +0.6 | * | 60 |
| 12 | Invention | 10.10 | 12.8 | 2.08 | 1.42 | 68.3 | +0.5 | * | 60 |
| 13 | Invention | 10.15 | 14.8 | 2.15 | 1.45 | 67.4 | +1.8 | ** | 50 |
| 14 | Invention | 10.10 | 14.0 | 2.13 | 1.40 | 65.7 | +1.8 | ** | 50 |
| 15 | Invention | 10.10 | 13.6 | 2.14 | 1.42 | 66.4 | +1.5 | ** | 50 |

EXAMPLE 3

In each of 13 test lots, 100 kg of defatted soybean was sprayed uniformly with 135 liters of hot water at 80° C. having dissolved therein each of the aliphatic carboxylic acid salts shown in Table 3 in an amount of 0.5 kg (0.25% by weight based on the entire koji-making materials). Then, the soybeans were steamed under heat for 10 minutes under a saturated steam pressure of 2 kg/cm$^2$·G. The steamed soybeans were mixed with 100 kg of roasted and crushed wheat, and a seed koji mold, *Aspergillus oryzae* ATCC-11866, (the number of available spores 10$^9$/g) was inoculated in the mixture. Then, 30 ml of a suspension of various contaminating bacteria separated from a soy sauce koji (the number of living cells 10$^7$/ml) was sprayed uniformly. Then, predetermined amounts of a culture broth of lactic acid baceterium, *Pediococcus halophilus* ATCC-13624, and yeast, *Saccharomyces rouxii* OUT-7135, were uniformly added. Each test lot was placed on one koji-making tray, and subjected to a usual control of soy sauce koji making for 42 hours in an aseptic koji-making incubator kept at 30° C. Thus, 13 kinds of soy sauce koji were obtained.

The number of cells of contaminating bacteria, lactic acid bacterium and yeast, and the specific activities of protease and amylase were examined. Furthermore, each koji was mixed with 400 liters of 22% sodium chloride solution, and fermented and aged at 30° C. The aged moromi liquid was analyzed for components and also organoleptically tested. The results obtained are shown in Table 3.

It is seen from the results obtained that the kojis in the lots of this invention contained contaminating bacteria in numbers about 1/1,111,000 to 1/17,241,000 time that in the control lot, and the amounts of protease and amylase secreted and accumulated were as large as 1.2 to 1.4 times and about 1.1 to 1.2 times those in the control lot, respectively. When the kojis obtained by the process of this invention are used in the production of soy sauce, the period required for fermentation and aging can be shortened to ⅓ to ½ of that required in the control lot, and the amounts of useful components such as nitrogen, reducing sugar, alcohol and lactic acid in the moromi liquid increase. Furthermore, the ratio of nitrogen utilization increased by 2.6 to 4.0%, and the soy sauce produced was organoleptically excellent.

TABLE 3 - (1)

| | | | | | Analysis of koji | | | | |
|---|---|---|---|---|---|---|---|---|---|
| Lot | Item | Additive | Lactic acid bacteria (cells/g) | Yeast (cells/g) | Number of contaminating bacteria (cells/g) | Number of lactic acid bacteria (cells/g) | Number of yeast (cells/g) | Specific protease activity | Specific amylase activity |
| 1 | Control | None | None | None | 5.0 × 10$^8$ | None | None | 100 | 100 |
| 2 | Invention | Sodium acetate (0.25%) | 6.2 × 10$^2$ | None | 1.3 × 10$^2$ | 2.6 × 10$^6$ | 0 | 136 | 122 |
| 3 | " | " | None | 5.0 × 10$^3$ | 7.2 × 10$^2$ | 0 | 2.6 × 10$^4$ | 141 | 118 |
| 4 | " | " | 6.2 × 10$^2$ | 5.0 × 10$^3$ | 6.6 × 10$^1$ | 2.1 × 10$^6$ | 3.3 × 10$^4$ | 139 | 120 |
| 5 | " | Sodium proprionate (0.25%) | 6.2 × 10$^2$ | None | 1.1 × 10$^2$ | 3.1 × 10$^6$ | 0 | 135 | 125 |
| 6 | " | " | None | 5.0 × 10$^3$ | 4.5 × 10$^2$ | 0 | 1.2 × 10$^4$ | 142 | 120 |
| 7 | " | " | 6.2 × 10$^2$ | 5.0 × 10$^3$ | 2.9 × 10$^1$ | 2.1 × 10$^6$ | 1.7 × 10$^4$ | 137 | 122 |
| 8 | " | Sodium formate (0.25%) | 6.2 × 10$^2$ | None | 8.1 × 10$^1$ | 1.8 × 10$^6$ | 0 | 133 | 120 |

TABLE 3 - (1)-continued

| Lot | Item | Additive | Lactic acid bacteria (cells/g) | Yeast (cells/g) | Analysis of koji | | | | |
|---|---|---|---|---|---|---|---|---|---|
| | | | | | Number of contaminating bacteria (cells/g) | Number of lactic acid bacteria (cells/g) | Number of yeast (cells/g) | Specific protease activity | Specific amylase activity |
| 9 | " | " | None | $5.0 \times 10^3$ | $3.1 \times 10^2$ | 0 | $1.6 \times 10^4$ | 139 | 119 |
| 10 | " | " | $6.2 \times 10^2$ | $5.0 \times 10^3$ | $3.1 \times 10^1$ | $1.1 \times 10^6$ | $1.6 \times 10^4$ | 136 | 119 |
| 11 | " | Sodium butyrate (0.25%) | $6.2 \times 10^2$ | None | $6.2 \times 10^1$ | $1.6 \times 10^6$ | 0 | 131 | 119 |
| 12 | " | " | None | $5.0 \times 10^3$ | $2.1 \times 10^2$ | 0 | $1.9 \times 10^4$ | 136 | 113 |
| 13 | " | " | $6.2 \times 10^2$ | $5.0 \times 10^3$ | $3.6 \times 10^1$ | $1.2 \times 10^6$ | $1.1 \times 10^4$ | 136 | 117 |

TABLE 3 - (2)

| Lot | Item | Analysis of the components of the moromi liquid | | | | | Ratio of nitrogen utilization (%) | Organoleptic test | | Number of days required for aging |
|---|---|---|---|---|---|---|---|---|---|---|
| | | NaCl (%) | T.N. (%) | R.S. (%) | Alc (%) | L.A. (%) | | Rating | Value | |
| 1 | Control | 17.30 | 1.72 | 3.60 | 2.15 | 0.7 | 82.6 | 0 | — | 180 |
| 2 | Invention | 17.20 | 1.78 | 4.05 | 2.20 | 1.3 | 85.9 | +1.5 | ** | 120 |
| 3 | " | 17.15 | 1.78 | 3.55 | 2.50 | 0.6 | 86.1 | +0.5 | * | 120 |
| 4 | " | 17.15 | 1.79 | 3.60 | 2.45 | 1.2 | 86.6 | +2.1 | ** | 100 |
| 5 | " | 17.20 | 1.78 | 4.10 | 2.20 | 1.2 | 85.9 | +1.3 | ** | 120 |
| 6 | " | 17.15 | 1.79 | 3.50 | 2.55 | 0.7 | 86.6 | +0.4 | * | 120 |
| 7 | " | 17.15 | 1.79 | 3.85 | 2.40 | 1.2 | 86.6 | +2.0 | ** | 100 |
| 8 | " | 17.20 | 1.77 | 4.10 | 2.30 | 1.3 | 85.4 | +1.3 | ** | 120 |
| 9 | " | 17.20 | 1.78 | 3.70 | 2.50 | 0.8 | 85.9 | +0.4 | * | 120 |
| 10 | " | 17.15 | 1.78 | 3.80 | 2.60 | 1.2 | 86.1 | +1.9 | ** | 100 |
| 11 | " | 17.25 | 1.77 | 4.05 | 2.35 | 1.4 | 85.2 | +0.4 | * | 120 |
| 12 | " | 17.20 | 1.78 | 3.80 | 2.55 | 0.6 | 85.9 | +0.4 | * | 100 |
| 13 | " | 17.15 | 1.77 | 3.95 | 2.50 | 1.2 | 85.7 | +0.6 | * | 100 |

What we claim is:

1. In a process for producing koji for a fermented food product which comprises inoculating a koji mold in a modified koji substrate and cultivating it at a temperature of about 20° C. to about 40° C. for a time sufficient to produce koji for the fermented food product in the presence of a salt of an aliphatic carboxylic acid with up to 4 carbon atoms; the improvement wherein the cultivation is carried out in the presence of from about $10^1$ to about $10^6$ cells per gram of said modified koji substrate of at least one added member selected from the group consisting of lactic acid bacteria and yeast selected from the group consisting of *Leuconostoc mesenteroides var. sake, Lactobacillus sake, Pediococcus halophilus, Pediococcus soyae, Streptococcus faecalis, Saccharomyces rouxii, Torulopsis etchellsii, Torulopsis versatilis* and *Saccharomyces cerevisiae*.

2. The process of claim 1 wherein the amount of said aliphatic carboxylic acid salt is about 0.05 to about 8% by weight based on the total weight of the unmodified koji substrate.

3. The process of claim 1 wherein said salt is selected from the group consisting of alkali metal salts and alkaline earth metal salts.

4. The process of claim 1 wherein said aliphatic carboxylic acid is selected from the group consisting of formic acid, acetic acid, propionic acid and butyric acid.

5. The process of claim 1 wherein said Koji is used in a fermented food product which is soy sauce, miso or sake.

6. The process of claim 1 wherein the amount of said added member is from about $10^2$ to about $10^4$ cells per gram of the modified Koji substrate.

7. The process of claim 1 wherein said salt of an aliphatic carboxylic acid is a member selected from the group consisting of sodium acetate, sodium propionate, sodium formate, sodium butyrate and potassium acetate.

8. The process of claim 1 wherein the cultivation is carried out in the presence of the lactic acid bacteria as the added member.

9. The process of claim 1 wherein said cultivation is carried out in the presence of yeast as the added member.

10. The process of claim 1 wherein the cultivation is carried out in the presence of a mixture of lactic acid bacteria and yeast.

* * * * *